(12) United States Patent
Billerbeck et al.

(10) Patent No.: US 9,729,853 B2
(45) Date of Patent: Aug. 8, 2017

(54) LOW PROFILE DEPTH CAMERA

(71) Applicant: Lumentum Operations LLC, Milpitas, CA (US)

(72) Inventors: Bryed Billerbeck, Cupertino, CA (US); James Yonghong Guo, Union City, CA (US); An-Chun Tien, San Jose, CA (US); Vincent V. Wong, Los Altos, CA (US); Ferdinand Mendoza, Union City, CA (US)

(73) Assignee: Lumentum Operations LLC, Milpitas, CA (US)

( * ) Notice: Subject to any disclaimer, the term of this patent is extended or adjusted under 35 U.S.C. 154(b) by 432 days.

(21) Appl. No.: 13/757,385

(22) Filed: Feb. 1, 2013

(65) Prior Publication Data

US 2013/0201289 A1    Aug. 8, 2013

Related U.S. Application Data

(60) Provisional application No. 61/594,856, filed on Feb. 3, 2012.

(51) Int. Cl.
*H04N 13/02* (2006.01)
*G01S 7/481* (2006.01)

(52) U.S. Cl.
CPC .......... *H04N 13/02* (2013.01); *G01S 7/4814* (2013.01)

(58) Field of Classification Search
CPC ..... G01S 7/4817; G01S 17/42; G02B 6/4204; G02B 6/3512; G01C 3/08
USPC ............ 356/3.01–3.15, 4.01–4.1, 5.01–5.15, 356/6–22, 28, 28.5
See application file for complete search history.

(56) References Cited

U.S. PATENT DOCUMENTS

| 5,907,395 | A * | 5/1999 | Schulz | G01B 11/002 356/139.03 |
| 6,714,286 | B1 * | 3/2004 | Wheel | G01S 7/493 342/128 |
| 2006/0044546 | A1 * | 3/2006 | Lewin | G01S 17/46 356/4.04 |
| 2006/0132752 | A1 * | 6/2006 | Kane | G01S 7/4817 356/5.02 |
| 2006/0227316 | A1 * | 10/2006 | Gatt | G01S 7/4811 356/5.09 |

* cited by examiner

*Primary Examiner* — Luke Ratcliffe
(74) *Attorney, Agent, or Firm* — Harrity & Harrity, LLP

(57) ABSTRACT

The use of one or more angled or curved and diverging light pipes or reflectors placed in a light source's, e.g. diode's, emission path at appropriate distances, angles and divergence, such that a diode's emission spot size is modified and or redirected from the diode's natural emission path to alternative planes at angle to the diode's natural emission path so that a diode emission safe spot size can be achieved on any plane at angle to the original diode natural emission path at minimum distances from the diode's point of emission.

20 Claims, 8 Drawing Sheets

LOW PROFILE DEPTH CAMERA

CROSS-REFERENCE TO RELATED APPLICATIONS

The present invention claims priority from U.S. Patent Application No. 61/594,856 filed Feb. 3, 2012, which is incorporated herein by reference.

TECHNICAL FIELD

The present invention relates to a depth camera for a time flight system, and in particular to a depth camera with a low profile for use in small form factor applications.

BACKGROUND OF THE INVENTION

In a Time of Flight (ToF) based depth detecting camera or other diode emission based depth detection device, laser safety is a critical issue as is camera or device form factor. Various applications of such technology require varying light source power levels. The higher the power level required, the larger the diode's emission spot size must be to be considered Class 1 laser safe. A conventional depth camera 1, illustrated in FIG. 1, includes a laser light source 2 with a diffusing optic 3, and a light detector 4 with a receiving optic and filter 5. Laser safety is normally achieved by placing the diffusing optic 3 perpendicular to the emission path to increase the effective emission spot size 6 as seen by the viewer. The greater the distance D, i.e. the optic 3 is from the emission point of the light source 2, the larger the spot size 6 becomes. The higher the light source power, the larger the spot 6 needs to be and the further the diffusion optic 4 must be from the emission source to maintain Class 1 laser safety.

Unfortunately, in today's world of miniaturized electronic devices, having to increase the camera or diode emission based device's size in the direction D of a diode's natural emission path may not meet a particular application or device's form factor requirements.

In the camera 1, the depth D has to be minimized so that the camera 1 can be fit into very tight spaces in the bezels of various displays, e.g. TVs, Laptops, Tablets, Computer Monitors, and Cell Phones. Unfortunately, the dimension D is limited by the sensor receive optic 5 and the placement of the diffuser 3 based on a given optical power level to maintain Class 1 laser safety.

An object of the present invention is to overcome the shortcomings of the prior art by providing a low profile, small form factor depth camera that is capable of fitting into the bezels of a plurality of display devices.

SUMMARY OF THE INVENTION

Accordingly, the present invention relates to a depth camera device comprising:
 a light source for launching a beam of light along a natural emission path at a natural divergence angle;
 an angled reflector for redirecting the beam of light from the natural emission path to a required direction of emission, while expanding the beam of light to a divergence angle greater than the natural divergence angle;
 a detector array for receiving and detecting returning portions of the beam of light reflected off of objects within the field of view; and receiver optics for receiving and focusing the returning portions of the beam of light onto the detector array.

BRIEF DESCRIPTION OF THE DRAWINGS

The invention will be described in greater detail with reference to the accompanying drawings which represent preferred embodiments thereof, wherein.

DETAILED DESCRIPTION

Figure 1:
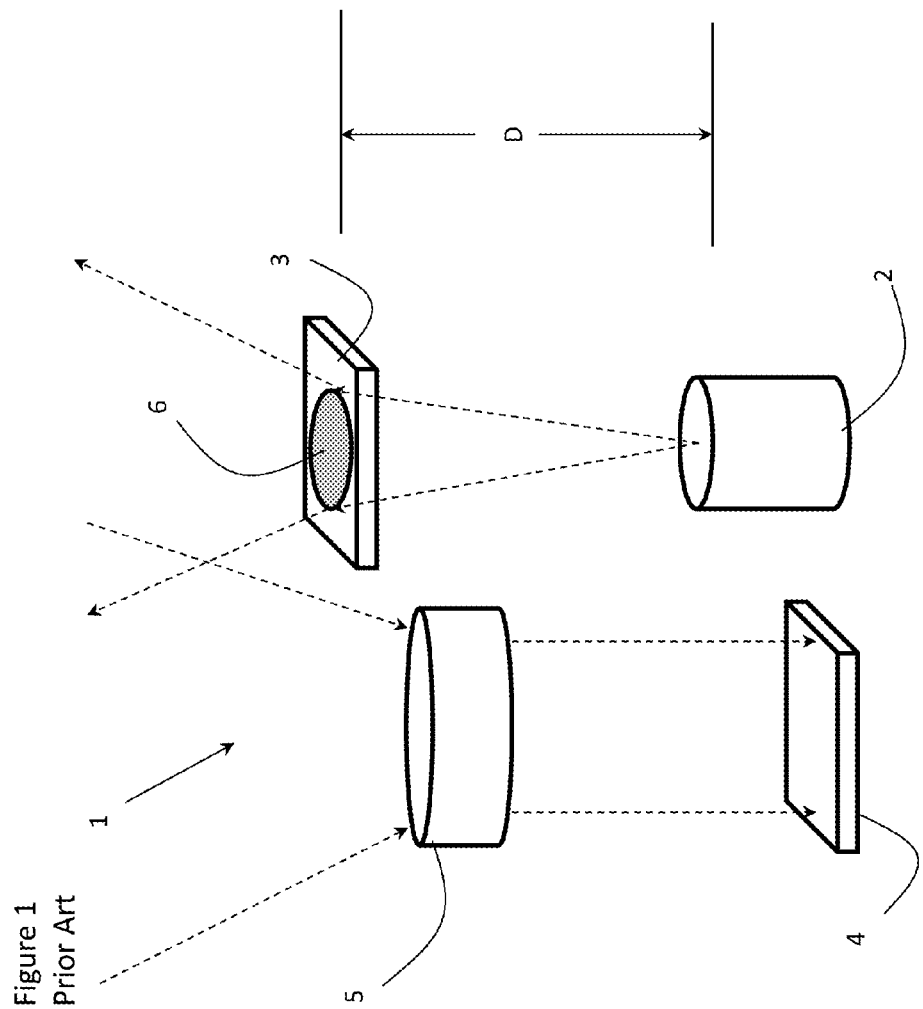
FIG. 1 is a schematic diagram of a conventional depth camera device.
Figure 2:
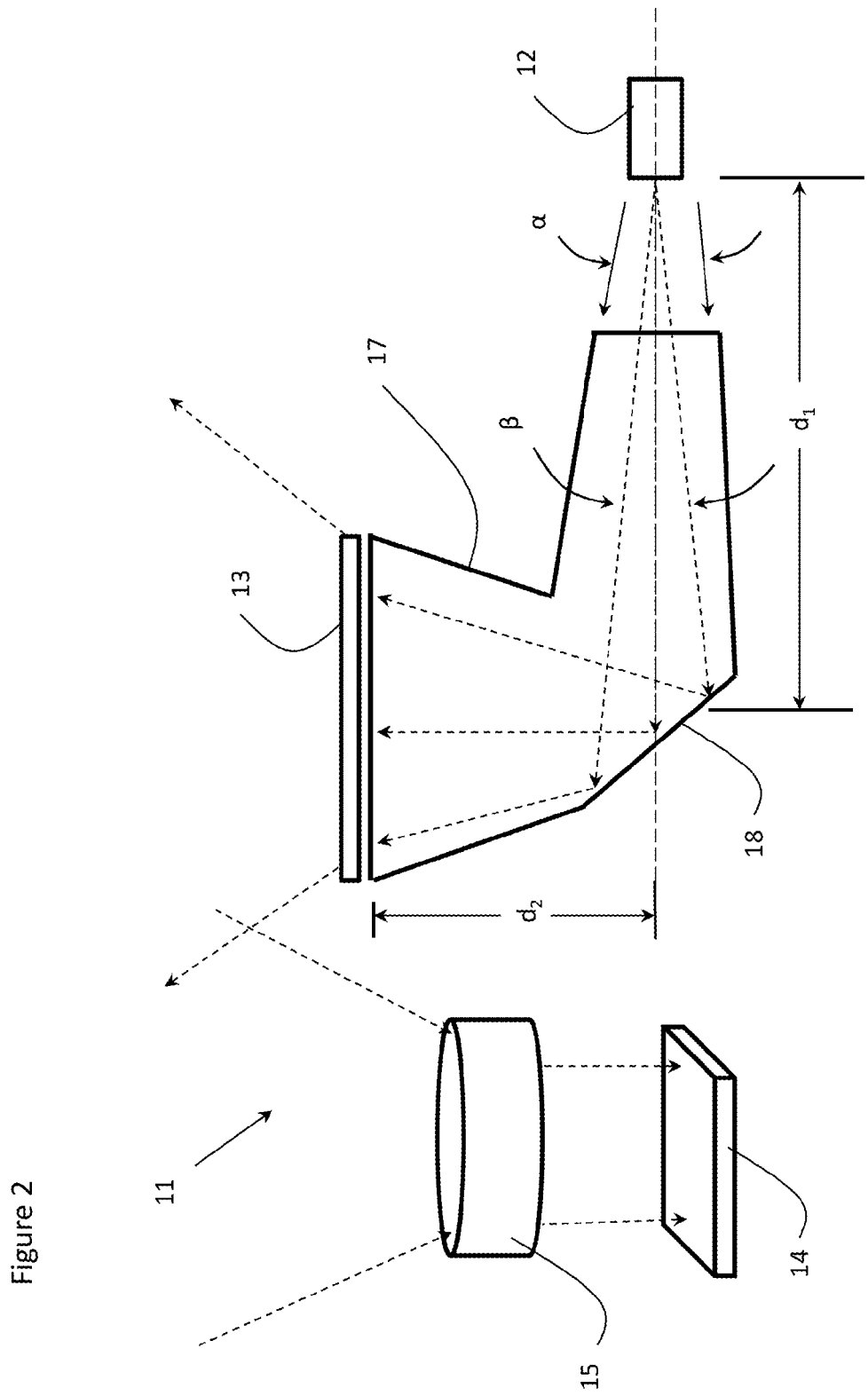
FIG. 2 is a schematic diagram of a depth camera in accordance with the present invention.

With reference to FIG. 1, a depth camera 11 in accordance with the present invention includes a light source 12, e.g. laser diode, with a diffuser optic 13, if necessary, for launching a beam of light into a field of view, and a light detector array 14 with a receiver optic 15 for receiving and detecting portions of the beam of light reflected off of objects in the field of view. Typically the receiver optic 15 can include at least one lens and an optical filter for filtering out background light not of the same wavelength as the light source 12.

In accordance with the present invention, the light source 12 is disposed to emit the beam of light along a natural emission path, which is substantially different, e.g. perpendicular, to the required direction of emission for the field of view of the camera 11. An angled or curved diverging light pipe or reflector 17 is placed in the natural emission path of the light source 12 to increase the emission spot size at an exit point, e.g. at the diffuser optic 13 if additional diffusion is necessary. A reflective surface 18 is disposed at an acute angle to the natural direction of emission to redirect the beam of light to the required direction of emission. Ideally, the angle of the reflective surface 18 to the direction of emission provides total internal reflection and may additionally expand the beam of light. The light source 12 and the light pipe and/or reflector 17 are positioned and sized so that the natural emission divergence angle $\beta$ of the light source 12 is contained within the light pipe 17, which has a larger divergence angle $\alpha$ than the divergence angle $\beta$ of the light source 12, i.e. resulting in a spot size at the exit of the light pipe 17 larger than the emission entrance spot size and larger than would normally occur traversing distances $d_1$ and $d_2$ in air. Ideally, the spot size on the reflective surface 18, at the exit of the light pipe 17 or at the diffuser 13 would be at or near a Class 1 laser safe size. Additionally, in the preferred embodiment, the light pipe or reflector 17 and the light source 12 are positioned so that the distance needed between the emission point of the light source 12 and the reflective surface 18 to achieve a Class 1 laser safe spot size on the reflective surface 18 or exit spot size of the light pipe 17 is managed in a direction $d_1$ where the device's form factor requirement may be less challenging, and at an angle, e.g. perpendicular, to the required direction of emission, $d_2$. A device's length rather than width or depth for example, may be less restrictive. The secondary diffusion optic, i.e. the diffuser 13, may or may not be necessary depending on whether or not the desired level of diffusion has occurred or if a diffusion pattern is applied to the exit surface of the light pipe or reflector 17. In some embodiments, the reflector 17 comprises the convex reflective surface 18 provided on a separate support structure without requiring the light pipe.

Ideally, the light pipe 17 is comprised of a material with a higher index of refraction than air, e.g. silica, germanium etc.

Figure 3:
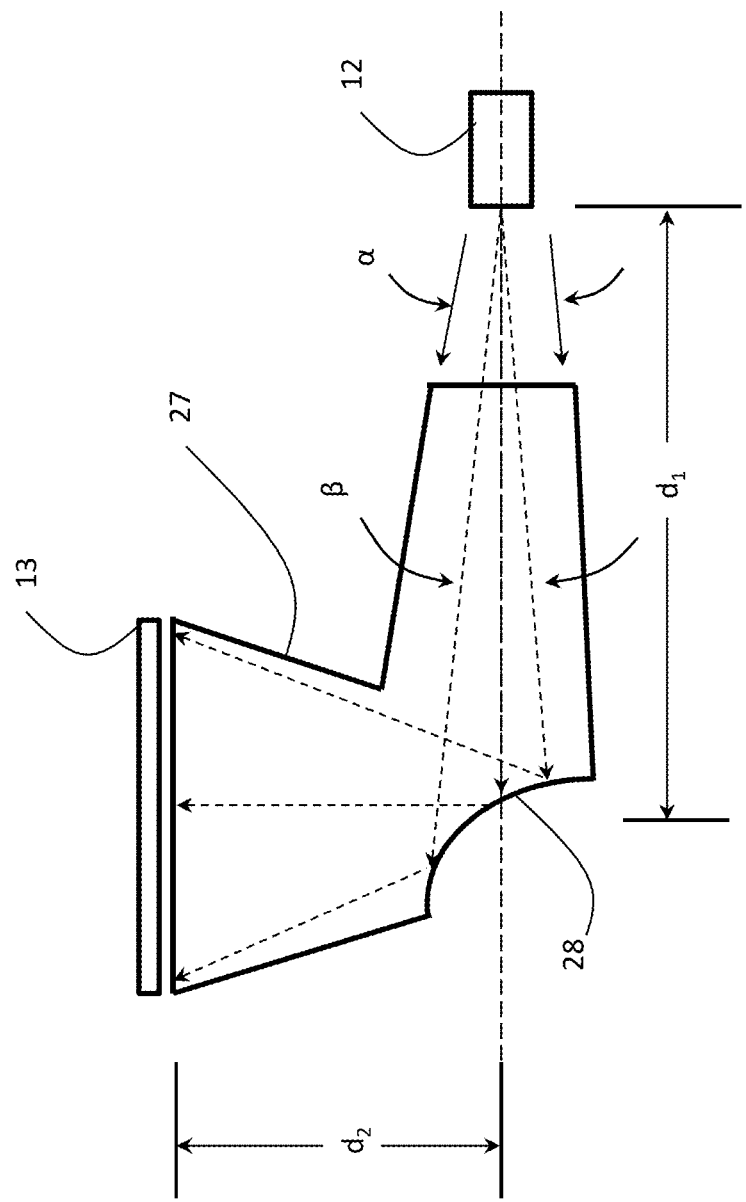
FIG. 3 is a schematic diagram of an alternative embodiment of the angled light pipe of the depth camera of FIG. 2.

In an alternate embodiment illustrated in FIG. 3, a light pipe and/or reflector 27 is provided in which the planar reflective surface 18 is replaced by an arcuate or convex reflective surface 28 providing even greater divergence of the beam of light. The other characteristics of the light pipe and/or reflector 27 are substantially the same as those of the light pipe or reflector 17, e.g. the natural emission divergence angle β of the light source 12 is contained within the light pipe or fully on the reflective surface 18, which has a larger divergence angle α than the light source's divergence angle β. In some embodiments, the reflector 27 includes the convex reflective surface 28 provided on a separate support structure without requiring the light pipe.

Figure 4:
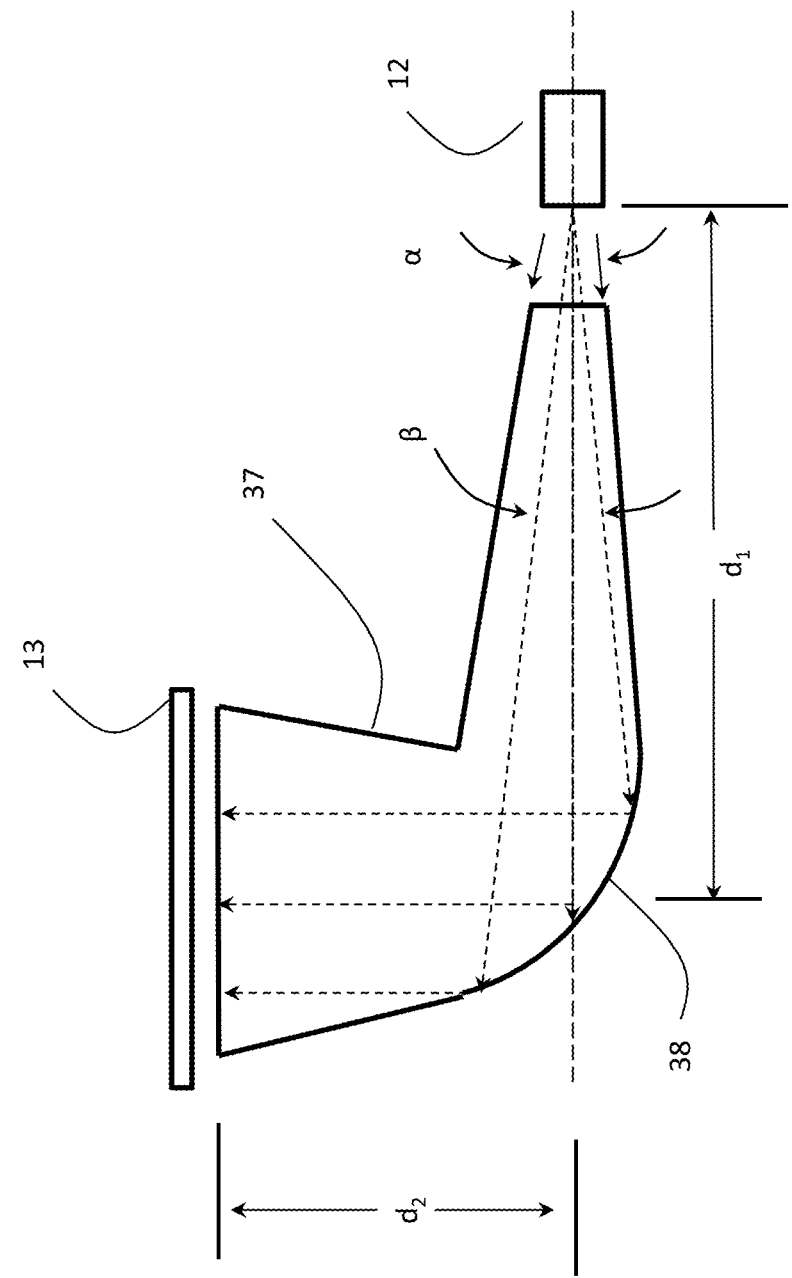
FIG. 4 is a schematic diagram of an alternative embodiment of the angled light pipe of the depth camera of FIG. 2.

In an alternate embodiment illustrated in FIG. 4, a light pipe and/or reflector 37 is provided in which the planar reflective surface 18 is replaced by an arcuate or concave reflective surface 38 providing collimation of the beam of light. The other characteristics of the light pipe and/or reflector 37 are substantially the same as those of the light pipe and/or reflector 17 and 27, e.g. the natural emission divergence angle β of the light source 12 is contained within the light pipe 37 or fully on the reflective surface 38, which has a divergence angle α near or equal to zero after light pipe or reflector collimation. In some embodiments, the reflector 37 comprises the concave reflective surface 38 provided on a separate support structure without requiring the light pipe.

A concave reflective surface 38 is used rather than convex surface 28, so that the light beam is collimated rather than diverged. The diffuser 13 works better with a collimated input beam than a divergent beam. Accordingly, the beam is expanded along the form factor friendly axis $d_1$, collimated just prior to the diffuser 13 and then further expanded, if necessary, by the diffuser 13. Ideally, the expansion of the beam of light is conducted in the form factor friendly direction $d_1$ so that the spot on the reflective surface 38 or at the exit of the light pipe 37 is Class 1 laser safe. Alternatively, when full class 1 beam expansion cannot be completed in the form factor friendly direction and further expansion is necessary, the diffuser 13 is provided at the exit of the light pipe and/or reflector 37 to further modify the light beam. The diffuser 13 is an optical element whose output beam characteristics are different (reshaped, usually wider and more diffuse) from the input beam characteristics.

Figure 5:
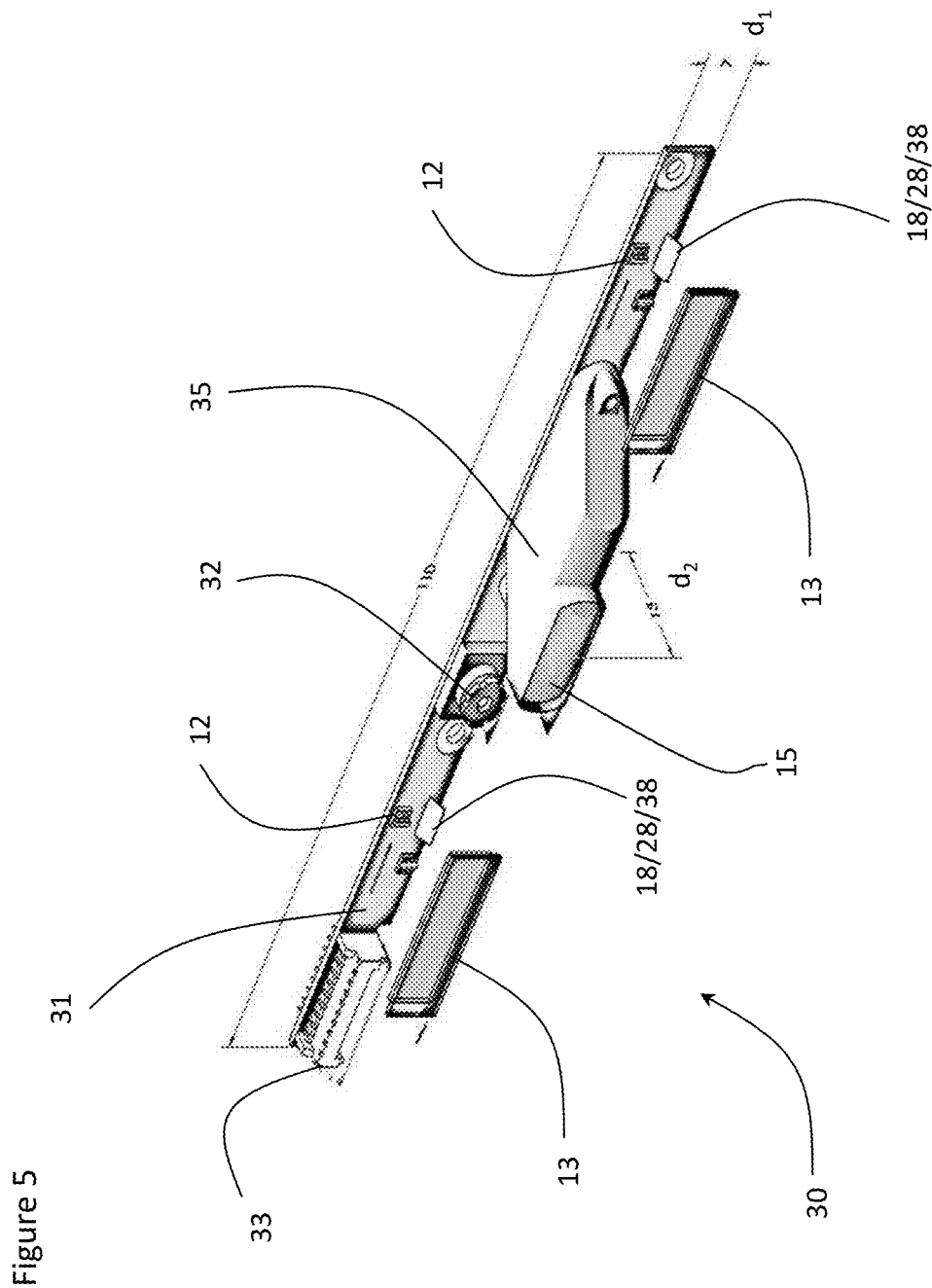
FIG. 5 is an isometric view of a depth camera system in accordance with the present invention.

With reference to FIG. 5, a complete depth camera assembly 30 includes a pair of light sources 12, each with their own diffuser optic 13, if required, and light pipe and/or reflector optics 17, 27 or 37, illustrated as a self-supported reflector with a reflective surface 18/28/38, mounted on printed circuit board 31. The natural direction of emission is illustrated as vertically, defined by the height of the PCB 31; however, the light source 12 could also be directed laterally so that the natural direction of emission is along the longitudinal axis of the PCB 31, if more distance $d_1$ is required. In the illustrated embodiment the height of the PCB 31 is 7 mm, while the width of the depth camera assembly 30 ($d_2$) is 13 mm and the length is 110 mm; however, other measurements are within the scope of the invention depending upon the requirements of the host device. A color (RGB) camera 32 is also provided in the depth camera assembly 30 to provide conventional color pictures and video, as is well known in the art. A data and power connector 33 is provided for connecting the camera assembly 32 to a host device.

A 3D imager produces phase measurements that are processed either on sensor or in a remote coprocessor to produce actual range data. Such a camera can be used in "Z-only" mode for applications, which require the use of range data only. The camera could also be used in "RGB+ Z", i.e. full 3D depth and 2 dimensional colors, modes for applications which utilize both traditional color as well as depth images. Depth and color processing can be done in the camera or with a pass-through mode in which unprocessed data can be passed to the host for processing.

To ensure the reception side of the depth camera 11 fits into the low profile form factor, a single or multiple lens element receiver optic 35 is designed with a combination of one or more light pipes and/or angled reflectors placed behind one or more lens elements in the natural reception path to redirect the light's natural path to new paths, e.g. substantially perpendicular to the natural reception path. The lens elements, angled reflectors and light pipes are positioned relative to one another so that the length of the objective lens' natural reception path can be optimally distributed within a given form factor volume. More specifically, the positioning of light pipes and lens elements is done so that overall objective lens length or diameter are managed in directions where the device's form factor requirement may be less challenging. A device's length rather than width or depth for example, may be less restrictive.

The basic idea is to change the direction of lens light after entry into the first lens element so that the length of the compound lens can be distributed in a direction more friendly to the host device's lateral or perpendicular directions, which is critical for small form factor depth cameras for embedding in various host devices.

Figure 6:
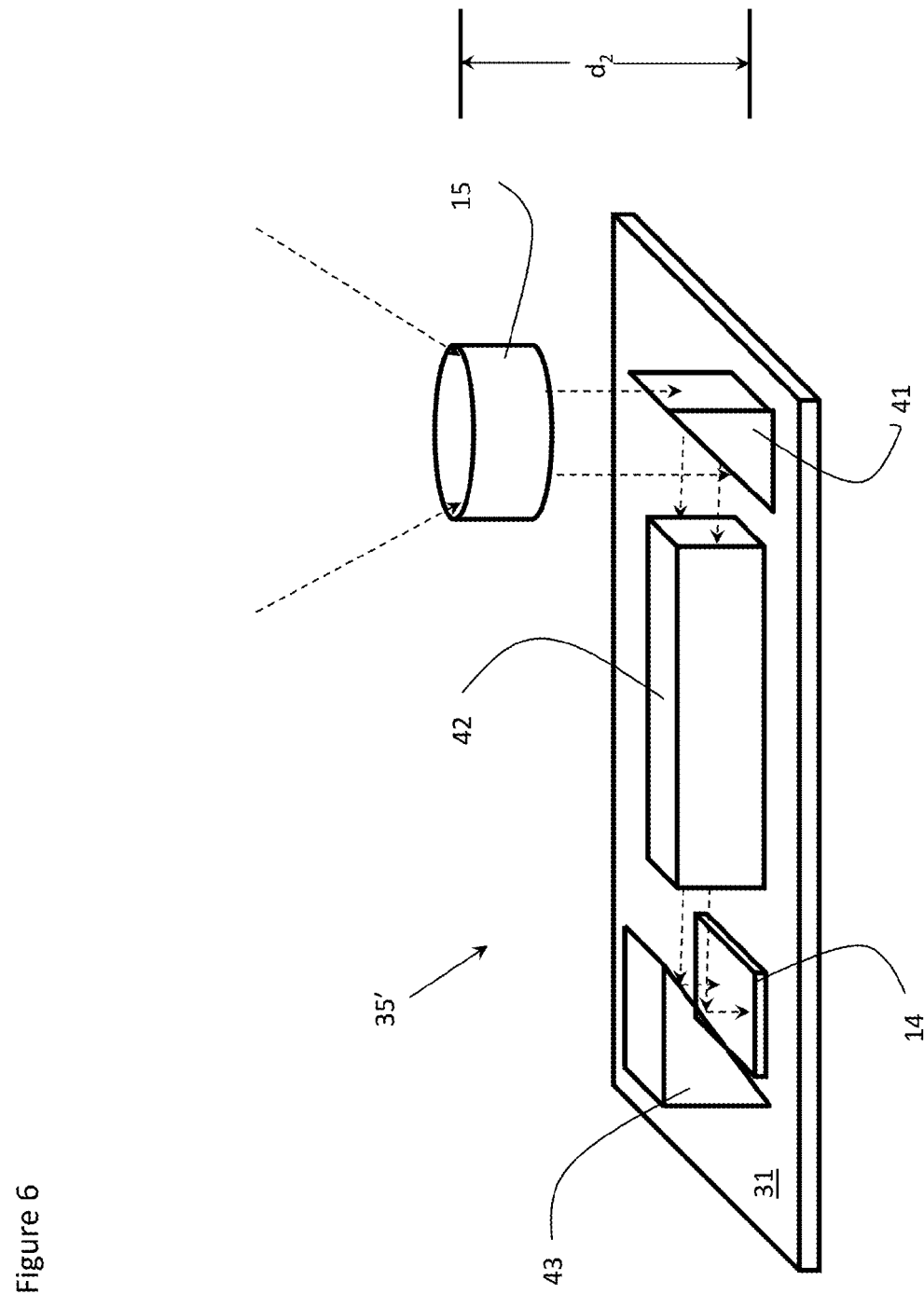
FIG. 6 is a schematic diagram of a receiver optic of the depth camera system of FIG. 5.

With reference to FIG. 6, the receiver optic 35' includes the entry optic 15, e.g. suitable lensing and optical filters, as herein before described, and a first angled reflector 41 for redirecting the returning light from the natural reception path to the new paths in the $d_1$ direction substantially perpendicular to the natural reception path, i.e. parallel to the PCB 31. The first angled reflector 41 includes a reflective surface at an acute angle to the incoming light and the PCB 31, e.g. 45°. A straight light pipe 42 is included for guiding the returning light to a second angled reflector 43, which redirects the returning light to the detector array 14. The straight light pipe 42 can also provide additional focusing, if the distance $d_1$ provided is insufficient to provide the required size and shape of spot size for the detector array 14. The second angled reflector 43 includes a reflective surface at an acute angle to the incoming light and the PCB 31, e.g. 45°.

Figure 7:
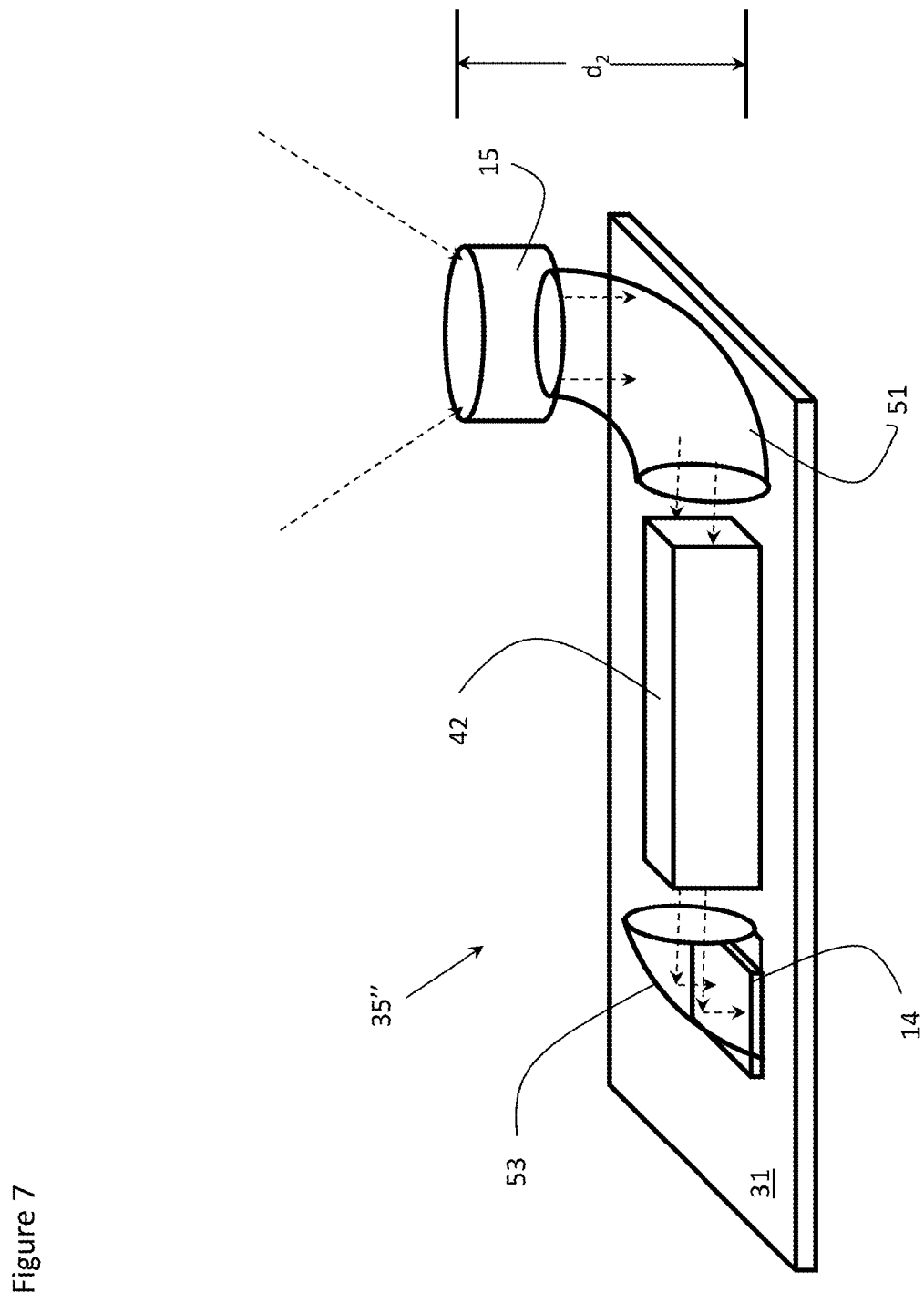
FIG. 7 is a schematic diagram of an alternative embodiment of a receiver optic of the depth camera system of FIG. 5.

With reference to FIG. 7, the receiver optic 35" includes the entry optic 15, e.g. suitable lensing and optical filters, as herein before described, and the first angled reflector comprises a first curved light pipe 51 for redirecting the returning light from the natural reception path to the new paths in the $d_1$ direction substantially perpendicular to the natural reception path, i.e. parallel to the PCB 31. The first curved light pipe 51 includes one or more reflective surfaces at an acute angle to the incoming light and the PCB 31, e.g. 45°. The straight light pipe 42 is included for guiding the returning light to the second angled reflector in the form of a second angled light pipe 53, which redirects the returning light to the detector array 14. The straight light pipe 42 can also provide additional focusing, if the distance $d_1$ provided is insufficient to provide the required size and shape of spot size for the detector array 14. The second curved light pipe 53 includes one or more reflective surfaces at an acute angle to the incoming light and the PCB 31, e.g. 45°.

Figure 8:
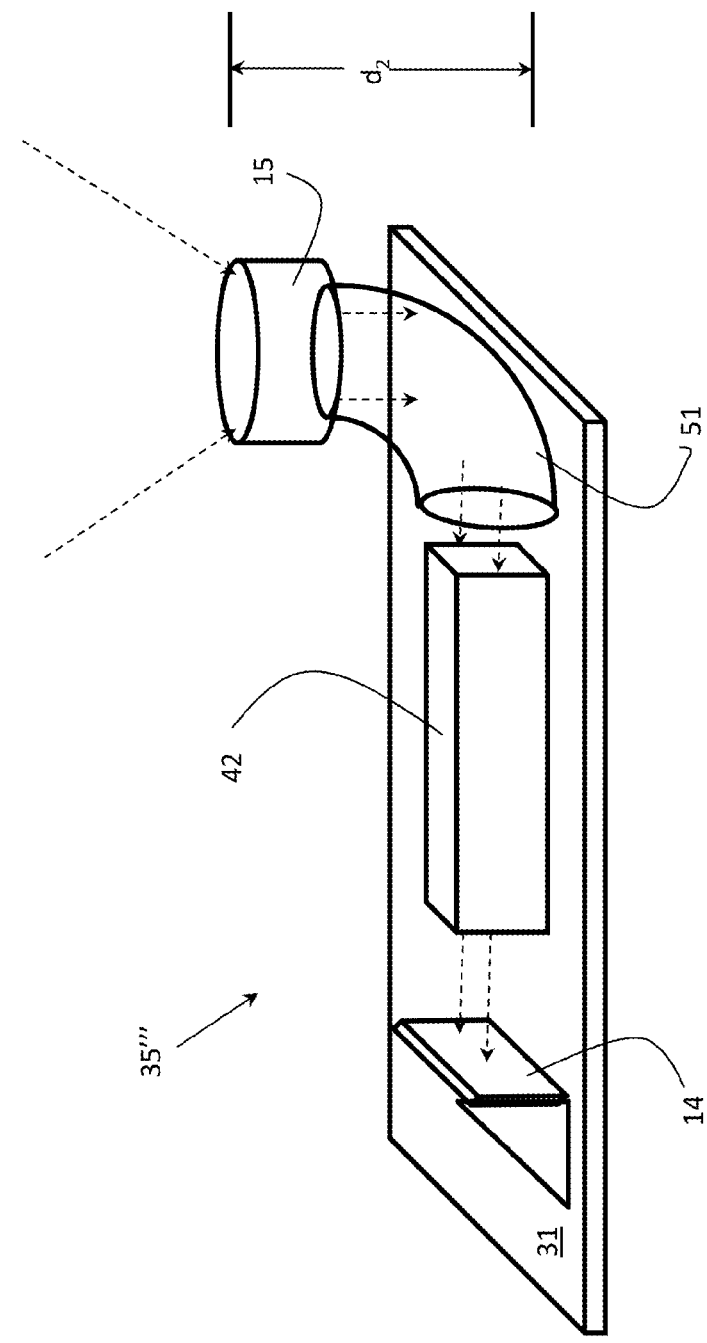
FIG. 8 is a schematic diagram of an alternative embodiment of a receiver optic of the depth camera system of FIG. 5.

With reference to FIG. 8, the receiver optic 35''' includes the entry optic 15, e.g. suitable lensing and optical filters, as herein before described, and the first curved light pipe 51 for redirecting the returning light from the natural reception path to the new paths in the $d_1$ direction substantially perpendicular to the natural reception path, i.e. parallel to the PCB 31. The first curved light pipe 51 includes one or more reflective surfaces at an acute angle to the incoming light and the PCB 31, e.g. 45°. The straight light pipe 42 is included for guiding the returning light to the detector array 14, which is disposed perpendicular to the PCB 31, by suitable supports. The straight light pipe 42 can also provide additional focusing, if the distance $d_1$ provided is insufficient to provide the required size and shape of spot size for the detector array 14.

Since the light detector array 14 is non-circular, one, some or all lens elements in the receiving optics 35, including the straight light pipe 42, are cropped on top, or top & bottom, or top, bottom & sides, etc. such that the objective lens image circle is reformatted to more closely match the non-circular light sensing array format and thereby further reducing or optimizing camera or device form factor.

We claim:

1. A depth camera device comprising:
a light source for launching a beam of light along a natural emission path at a natural divergence angle;
a reflector for receiving the beam of light and for redirecting the beam of light, using a single internal reflection, from the natural emission path to a required direction of emission over a field of view and expanding the beam of light to a divergence angle greater than the natural divergence angle, thereby increasing a spot size of the beam of light;
a detector array for receiving and detecting portions of the beam of light, expanded to the divergence angle greater than the natural divergence angle, reflected off of objects within the field of view; and
receiver optics for receiving and focusing the portions of the beam of light, expanded to the divergence angle greater than the natural divergence angle, onto the detector array.

2. The depth camera device according to claim 1, wherein the reflector is positioned relative to the light source, whereby the beam of light is expanded to achieve a Class 1 laser safe spot size on or near a surface of the reflector.

3. The depth camera device according to claim 1, wherein the reflector comprises a light pipe with a larger divergence angle than the natural divergence angle.

4. The depth camera device according to claim 1, wherein the reflector includes a reflective surface disposed at an acute angle to the natural emission path.

5. The depth camera device according to claim 4, wherein the reflective surface is convex for increasing the divergence angle of the beam of light.

6. The depth camera device according to claim 4, further comprising:
a diffuser, optically coupled to the reflector, for diffusing the beam of light over the field of view,
wherein the reflective surface is concave for collimating the beam of light onto the diffuser.

7. The depth camera device according to claim 1, wherein the reflector comprises a light pipe with a larger divergence angle than the natural divergence angle and a reflective surface disposed at an acute angle to the natural emission path.

8. The depth camera device according to claim 7, wherein the reflective surface is convex for increasing the divergence angle of the beam of light.

9. The depth camera device according to claim 1, further comprising:
a diffuser, optically coupled to the reflector, for diffusing the beam of light over the field of view,
wherein the reflector includes a reflective surface that is concave for collimating the beam of light onto the diffuser.

10. The depth camera device according to claim 1, wherein the reflector redirects the beam of light substantially perpendicularly from the natural emission path.

11. The depth camera device according to claim 1, further comprising:
a diffuser, optically coupled to the reflector, for diffusing the beam of light over the field of view.

12. The depth camera device according to claim 1, further comprising:
a printed circuit board supporting the light source and the detector array,
wherein the natural emission path is parallel to the printed circuit board.

13. The depth camera device according to claim 12, wherein the receiver optics include a first angled reflector for redirecting the portions of the beam of light, expanded to the divergence angle greater than the natural divergence angle, parallel to the printed circuit board.

14. The depth camera device according to claim 13, wherein the first angled reflector comprises a first curved light pipe.

15. The depth camera device according to claim 13, further comprising:
a second angled reflector for redirecting the portions of the beam of light, expanded to the divergence angle greater than the natural divergence angle, onto the detector array.

16. The depth camera device according to claim 15, wherein the second angled reflector comprises a first curved light pipe.

17. The depth camera device according to claim 15, further comprising:
a straight light pipe for guiding the portions of the beam of light, expanded to the divergence angle greater than the natural divergence angle, between the first and second angled reflectors.

18. The depth camera device according to claim 17, wherein
the detector array has a non-circular shape, and
the straight light pipe is cropped, whereby the portions of the beam of light, expanded to the divergence angle greater than the natural divergence angle, are reformatted to more closely match the non-circular shape of the detector array.

19. The depth camera device according to claim 13, further comprising:
a straight light pipe for guiding the portions of the beam of light, expanded to the divergence angle greater than the natural divergence angle, between the first angled reflector and the detector array, wherein the detector array is disposed perpendicular to the printed circuit board.

20. The depth camera device according to claim 19, wherein the detector array has a non-circular shape, and the straight light pipe is cropped, whereby the portions of the beam of light, expanded to the divergence angle greater than the natural divergence angle, are reformatted to more closely match the non-circular shape of the detector array.

* * * * *